United States Patent [19]

Donovan, Sr.

[11] Patent Number: 5,064,705

[45] Date of Patent: Nov. 12, 1991

[54] STABILIZING LAMINATE INSERTS FOR RESIN TRANSFER MOLDING

[75] Inventor: Thomas P. Donovan, Sr., West Haven, Conn.

[73] Assignee: United Technologies Corporation, Hartford, Conn.

[21] Appl. No.: 399,677

[22] Filed: Aug. 28, 1999

[51] Int. Cl.⁵ .................. B29C 43/18; B29C 45/02
[52] U.S. Cl. .................................. 428/121; 156/227; 156/245; 264/258; 264/328.5; 428/138; 428/542.8
[58] Field of Search ............... 428/542.8, 121, 138; 156/227, 245; 264/258, 328.5

[56] References Cited

U.S. PATENT DOCUMENTS

| | | | |
|---|---|---|---|
| 3,353,315 | 11/1967 | Barker | 52/281 X |
| 4,044,188 | 8/1977 | Segal | 428/283 |
| 4,051,290 | 9/1977 | Jutte et al. | 428/218 X |
| 4,080,714 | 3/1978 | Emerson | 29/525 X |
| 4,177,306 | 12/1979 | Schulz et al. | 428/107 |
| 4,369,608 | 1/1983 | Miura et al. | 428/31 X |
| 4,751,135 | 6/1988 | Fenton | 428/297 |
| 4,988,469 | 1/1991 | Reavely et al. | 264/258 X |

*Primary Examiner*—Henry F. Epstein

[57] ABSTRACT

A preform assembly for use with a resin transfer molding apparatus. The preform assembly includes a dry fabric preform and a thin precured fiber-reinforced resin impregnated laminate, the preform being folded about and firmly fastened to said laminate to form a preform assembly having a stiffened and stabilized preform edge, wherein the edge aids in the insertion of the preform assembly into a mold cavity or channel of a resin transfer mold apparatus. Methods for making such preform assembly and composite article are also disclosed.

11 Claims, 2 Drawing Sheets

STABILIZING LAMINATE INSERTS FOR RESIN TRANSFER MOLDING

This invention was made with Government support. The Government has certain rights in this invention.

CROSS REFERENCE TO RELATED APPLICATIONS

This application is related to commonly assigned U.S. application Ser. No. 07/399,678 filed on even date herewith entitled "Stabilizing Foam Inserts for Resin Transfer Molding".

TECHNICAL FIELD

The present invention relates to resin transfer molding and, more specifically, to a means of loading preform assemblies into a resin transfer mold apparatus.

BACKGROUND ART

Resin transfer molding is a closed mold, low pressure process applicable to the fabrication of complex, high performance composite articles of both large and small size. Several different resin transfer molding processes are well known to those skilled in the art. The process differs from various other molding processes in that a reinforcing material or preform such as glass fibers or other fiber reinforcement, is placed separately into a mold tool cavity. Resin is then injected under pressure into the mold cavity to combine with the preform to form a fiber reinforced plastic composite product.

Typically, a pre-shaped fiber reinforced preform is positioned within a molding tool cavity and the molding tool is closed. The mold is subsequently evacuated by pulling a vacuum through the mold. A feed line connects the closed molding tool cavity with a supply of liquid resin and the resin is pumped or "transferred" into the cavity where it impregnates and envelopes the fiber reinforced preform and subsequently cures. The cured or semi-cured product is then removed from the molding tool cavity.

The primary advantage of resin transfer molding resides in its capacity for high rate production. Although this process is widely known, the use of this molding process has not become widespread because of problems associated with the process. For example, use of the process has been hampered by the difficulties associated with stabilizing and de-bulking the dry composite preform and loading the same into the mold cavity. Maintaining adequate tolerances of the components and sealing the mold apparatus is also problematic.

Specifically with regard to molding aerospace structures, these difficulties often yield disoriented fibers, areas which are resin rich or lean depending upon bulk variations of a preform assembly, or porosity (i.e. trapped air due to an improper vacuum) within the composite which greatly diminishes the specific strength of the component. Due to the high costs of both fabrication and material, rejection of a single part out of a batch can negate the savings initially. As a result, use of the process has typically been limited to rather simple, low-strength components as compared to high strength aerospace components.

Thus, there is a continuing need in this field of art for means to obviate the above problems.

DISCLOSURE OF THE INVENTION

Accordingly, it is an object of the present invention to provide a stabilization technique which facilitates the handling and loading of preform assemblies into a resin transfer mold apparatus.

Another objective is to produce an improved component of increased strength and allow for net molding of same.

The present invention utilizes a preform assembly for use in a resin transfer mold apparatus. More specifically, the present invention comprises a dry fabric preform and a thin precured fiber-reinforced resin impregnated laminate. The preform is folded about the laminate to form a preform assembly having a stiffened and stabilized preform edge. The edge aids in the insertion of the preform assembly into a mold cavity or channel of the resin transfer mold apparatus.

A further aspect of the disclosure includes a method for preparing a preform assembly which includes cutting a dry fabric preform to the desired shape and thickness, forming a thin precured fiber-reinforced resin impregnated laminate to typically conform to the desired preform shape, placing the laminate over the preform, folding the preform about a fold line so that the laminate is surrounded by the preform, and firmly fastening the preform to the laminate to form a preform assembly having a stiffened and stabilized preform edge section.

A still further aspect of the disclosure includes a method for making a composite article which includes forming a preform assembly, as disclosed by the present invention, inserting an edge of the preform assembly into a mold cavity of a resin transfer molding apparatus, tapping the preform assembly to fully occupy the mold cavity, closing the molding apparatus, introducing resin into the cavity to form a composite article, and removing the article from the molding apparatus subsequent to curing and cooling the article.

The foregoing and other features and advantages of the present invention will become more apparent from the following description and accompanying drawings.

BEST MODE FOR CARRYING OUT THE INVENTION

Figure 1:
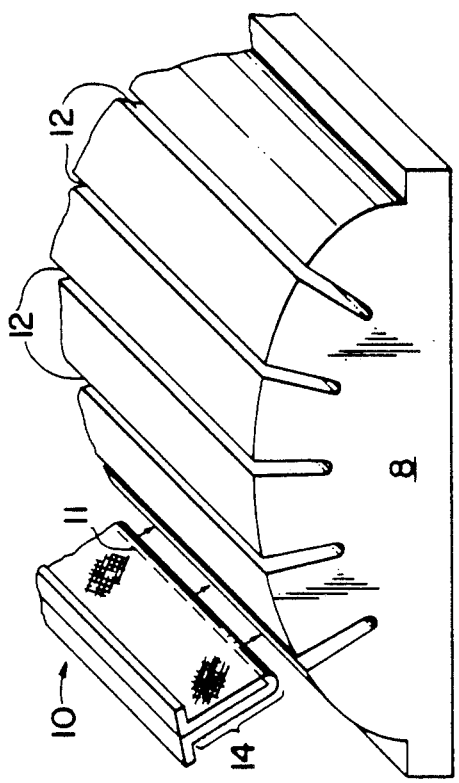
FIG. 1 depicts an exploded perspective view of a prior art mold body and a prior art preform.
Figure 2:
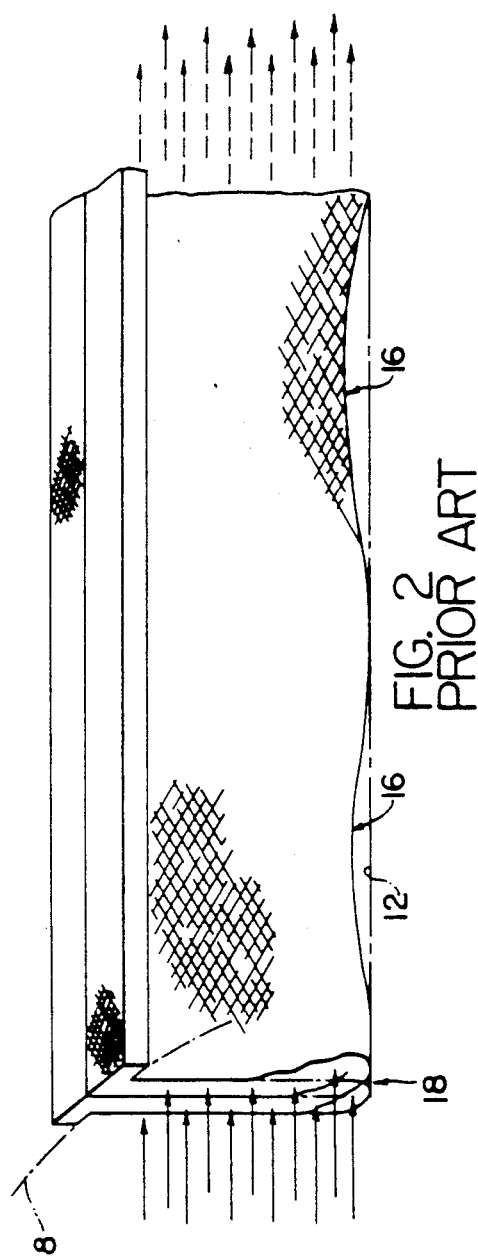
FIG. 2 illustrates a perspective view of the dislodged and disoriented fibers, as well as areas of unreinforced resin, associated with conventional resin transfer mold processes.

A prior art resin transfer mold and preform are depicted in FIGS. 1 and 2. According to FIG. 1, a dry fabric preform 10, typically referred to as a stringer, is loaded into a channel or mold cavity 12 of a mold body 8. Due to the need to maintain high fiber volume, the mold cavity 12 is generally smaller in volume than the bulky stringer 10, despite the stitching 11 which provides some debulking and stabilization to the stringer 10. Hence, it is difficult to ensure that the entire shear web 14 fully occupies the mold cavity 12.

Problems with the prior art are more clearly visible in FIG. 2. In FIG. 2, areas or pockets of unreinforced resin 16 are formed as a result of the unfilled sections of the mold cavity 12 with the shear web 14. Additionally, dislodged and disoriented fibers 18 are often a result of resin injection pressures and resin flow. These fibers 18 severely degrade the strength of the composite component.

Figure 5:
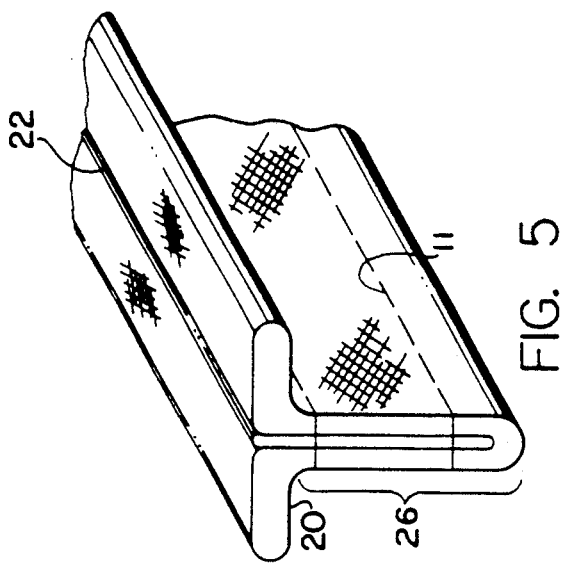
FIG. 5 illustrates a perspective view of an assembled laminate and dry fabric preform to yield the present invention.
Figure 3:
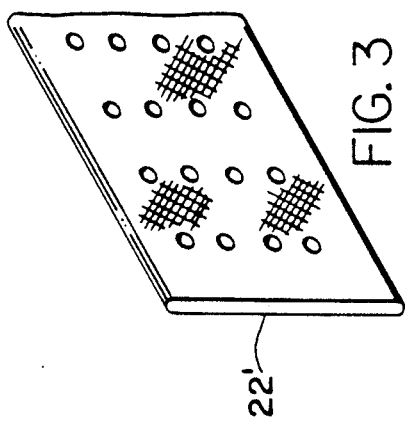
FIG. 3 illustrates a perspective view of the laminate used in the present invention.
Figure 4:
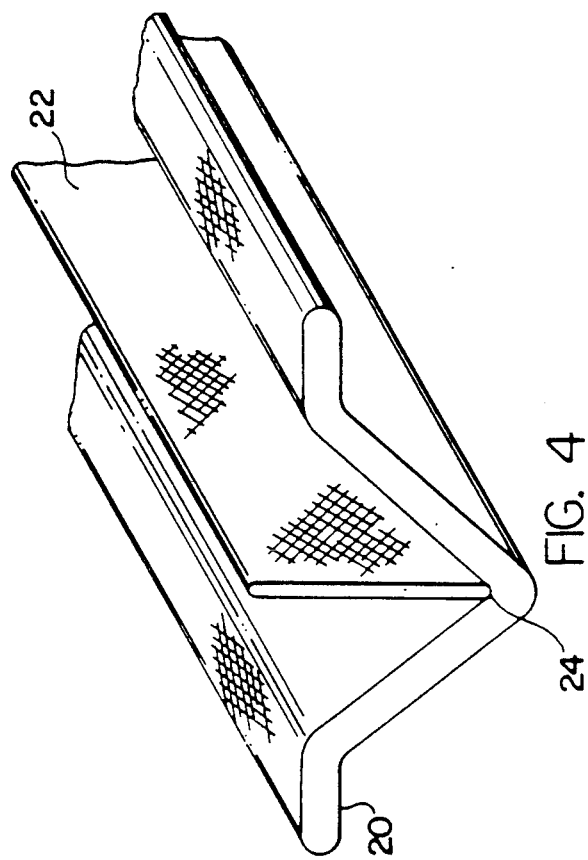
FIG. 4 illustrates a perspective view of a partly assembled laminate and dry fabric preform, and their relationship thereto, of the present invention.

A clearer understanding of the present invention may be made by reference to FIGS. 3, 4 and 5. In FIGS. 3 and 4, a fiber reinforced resin impregnated laminate 22 and 22' is depicted. As illustrated, the laminate may be homogeneous 22 or perforated 22' (to aid in the capillary or wicking action of the resin).

A dry fabric preform 20 is illustrated in FIG. 4. The preform 20 comprises a plurality of fabric patterns cut to the desired two dimensional shape and stacked to yield the desired preform thickness.

The laminate 22, 22' is placed over the preform 20 adjacent to a fold line 24. The preform 20 is then folded about the fold line 24 so that the laminate 22, 22' is surrounded by the preform 20. The laminate 22, 22' is firmly fastened to the preform 20, by a means such as stitching 11, to form a preform assembly having a stiffened and stabilized preform edge section 26.

The edge section 26 is inserted into the mold channel or cavity 12. The section occupies the entire depth of the cavity and may be hand or mallet tapped into place.

More specifically, the laminate is a thin fiber-reinforced resin impregnated composite. It is precured to impart rigidity to it, as well as serving as a stabilizer to the preform. This rigidity also facilitates the shaping of the laminate to typically conform to the shape of the preform and ultimately, the composite article. The fibers and resins used in the laminate are those conventional to the art such as glass, polyaramid, graphite, epoxies, polyester, vinyl esters, phenolics and urethanes.

Preferably, the laminate is compatible to the resin to be injected into the mold. By compatible is meant that the insert maintains its mechanical and thermal properties and is able to withstand the pressures and temperatures exerted during the molding process. Preferably, the laminate has a thickness that will provide suitable rigidity to stabilize the preform and ensure an improvement in mechanical properties, but is still flexible enough to maintain any contours in the laminate. Depending on the thickness of the preform and the width of the mold cavity, the laminate will typically have a thickness between about 0.005 inches and about 0.01 inches.

In addition, the laminate preferably has a height dimension such that it will be accessible from the top of the mold cavity when placed in the mold cavity. This allows the laminate to be firmly placed within the cavity as further described herein.

The dry fabric preform comprises a plurality of fabric patterns cut to the desired two-dimensional shape. Preferably, the preform is untreated to ensure optimal strength. These patterns are then stacked upon each other to yield a desired preform thickness. The fabric preform used in the present invention are also made from materials conventional to those in the art, such as E glass fibers (for low modulus applications), S glass fibers (for high modulus applications), graphite fibers, aramid fibers including KEVLAR (TM) polyamide fiber (E.I. Dupont de Nemours, Wilmington, Del.), and the like. For use in the preforms, such fibrous reinforced material can be used in any of various configurations including, for example, random chopped fiber, continuous random fiber, and oriented continuous fiber, for example, nonwoven, woven, knitted, braided, etc.

The laminate is placed over the preform adjacent to a fold line, such fold line being the symmetrical center of the preform. The preform is folded about and surrounds the laminate. The preform is firmly fastened to the laminate to form a preform assembly having a stiffened and stabilized preform edge section. The preform assembly has a combined thickness (laminate and preform itself) or cross sectional area that is slightly larger than the channel or cavity width of the particular mold apparatus. By this is meant that the preform assembly will fit snugly into the channel or cavity but not so tight that the dry fabric preform will bunch or gather.

The preform assembly for use in a resin transfer mold apparatus is prepared by cutting a dry fabric preform to the desired shape, the preform comprising a plurality of two-dimensional fabric patterns stacked to the desired thickness. A thin precured fiber-reinforced resin impregnated laminate is formed, by methods known to one skilled in the art, to typically conform to the desired preform shape. The laminate is then placed over the preform adjacent to a fold line, the fold line being the symmetrical centerline of the preform. The preform is folded about the fold line, surrounding the laminate. Subsequently, the preform is firmly fastened to the laminate to form a preform assembly having a stiffened and stabilized preform edge section. By firmly fastened is meant that the preform is held in a fixed relation to the preform. This fastening is typically achieved by methods known to one skilled in the art. For example, the preform assembly may be stitched together with a thread of polyester, KEVLAR (TM), etc., or may be adhesively attached by using a hot iron.

The stabilized edge section is inserted into the mold channel or cavity by hand. The top of the preform assembly is hand or lightly mallet tapped into place to ensure that the cavity or channel will be fully occupied by the preform assembly. This may also be accomplished by using the cover of the resin transfer mold or any other suitable means. By fully occupied is meant that the stabilized section edge occupies the entire depth of the mold cavity and is flush against each side of the cavity, i.e. the sides and bottom. Suitable precautions are preferably taken to avoid any possible shearing to the fabric.

The dry fabric preform may also be open-faced at its fold line. This embodiment is foreseeable/desirable when the closed wrapping of the preform is not needed for extra structural performance. Necessary steps should be taken to ensure that the now opened laminate is locked, i.e, firmly held in place, with the preform at the fold line. A lock stitch or the like is suitable.

While a T-shaped preform assembly is depicted in FIG. 5, it will be apparent that the teaching of the present invention is applicable to a variety of preform shapes, such as flat surfaces, circular surfaces, etc.

When the mold is fully assembled, the resin is transferred under pressure into the evacuated article chamber impregnating the dry fabric preform and laminate assembly. The resin is forced into the mold under conventional pressures. These typically range from about 85 psi to about 300 psi. Once the mold is full, the resin impregnated preform assembly is exposed to conventional pressures and temperatures appropriate for the particular resin and fiber used. Typically, these pressures and temperatures are about 5 psi to about 300 psi and about ambient to about 500 F. Once fully cured, the mold can be disassembled and the fully cured article may be removed.

The use of the preform assembly not only provides a stabilizing means to the component article, but also aids in the insertion of such assembly into a mold cavity. This preform assembly provides a substantial improvement to other preforms available in the art because only a minimal, if not negligible, amount of dislocation and distortion of the preform fibers associated with the resin injection process occurs. As a result, net molding of composite articles becomes more feasible as the trimming process is substantially eliminated. Overall, a more efficient and desirable process for producing resin transfer mold high strength components is created.

Although the invention has been shown and described with respect to a preferred embodiment, it will be understood by those skilled in the art that various changes in form and detail thereof may be made without departing from the spirit and scope of the claimed invention.

What is claimed is:

1. A preform assembly for use with a resin transfer molding apparatus which comprises:
    (a) a dry fabric preform; and
    (b) a thin fiber-reinforced resin impregnated laminate, wherein said laminate is precured for imparting rigidity to said laminate;
    (c) said preform folded about said laminate and said preform firmly fastened to said laminate to form a preform assembly having a stiffened and stabilized preform edge;
   wherein said edge aids in the insertion of said preform assembly into a cavity of a resin transfer mold apparatus.

2. The preform assembly according to claim 1 wherein said dry fabric preform comprises a plurality of fabric patterns having a desired two-dimensional shape and thickness.

3. The preform assembly according to claim 1 wherein said preform comprises material selected from the group consisting of E glass fibers, S glass fibers, graphite fibers and aramid fibers.

4. The preform assembly according to claim 1 wherein said laminate is perforated.

5. The preform assembly according to claim 1 wherein said laminate is homogeneous.

6. The preform assembly according to claim 1 wherein the combined thickness of said preform and said laminate to form said assembly is such that said assembly fits snugly into said mold cavity.

7. A method for preparing a preform assembly for use in a resin transfer mold apparatus which comprises the steps of:
    (a) cutting a dry fabric preform to a desired shape, said preform comprising a plurality of fabric patterns stacked to the desired preform thickness;
    (b) forming a thin fiber-reinforced resin impregnated laminate to match said desired preform shape, wherein said laminate is precured for imparting rigidity to said laminate;
    (c) placing said laminate over said preform and adjacent to a fold line, said fold line being the symmetrical centerline of said preform;
    (d) folding said preform about said fold line so that said laminate is surrounded by said preform; and
    (e) firmly fastening said preform to said laminate to form a preform assembly having a stiffened and stabilized preform edge section,
   wherein said edge section aids in the insertion of said preform assembly into said resin mold transfer apparatus.

8. The method according to claim 7 wherein said fastening is stitching.

9. The method according to claim 7 Wherein said fastening is an adhesive.

10. A method for making a composite article which comprises the steps of:
    (a) forming a preform assembly, said assembly comprising a dry fabric preform and a thin fiber-reinforced resin impregnated laminate, wherein said laminate is precured for imparting rigidity to said laminate, said preform folded about said laminate and said preform firmly fastened to said laminate to form a preform assembly having a stiffened and stabilized preform edge;
    (b) inserting said preform edge of said preform assembly into a mold cavity of a resin transfer molding apparatus;
    (c) tapping said preform assembly to fully occupy said mold cavity;
    (d) closing said molding apparatus on said preform assembly;
    (e) introducing resin into said cavity of said molding apparatus to form a composite article; and
    (f) removing said article from said molding apparatus subsequent to curing and cooling said article,
   wherein said article is a net molded part having a minimal amount of dislocation and distortion of said preform fibers.

11. The method according to claim 10 wherein said insertion is by hand.

* * * * *

UNITED STATES PATENT AND TRADEMARK OFFICE
CERTIFICATE OF CORRECTION

PATENT NO. : 5,064,705

DATED : Nov. 12, 1991

INVENTOR(S) : Thomas P. Donovan, Sr.

It is certified that error appears in the above-identified patent and that said Letters Patent is hereby corrected as shown below:

```
On the Title Page:
-- Item [22] after "Filed:", "Aug. 28, 1999"
                should be --Aug. 28, 1989--.
```

Signed and Sealed this

Twenty-third Day of March, 1993

Attest:

STEPHEN G. KUNIN

*Attesting Officer*   *Acting Commissioner of Patents and Trademarks*